June 17, 1924.
A. S. DIACK
1,497,749
DENTAL TOOL
Filed May 10, 1922
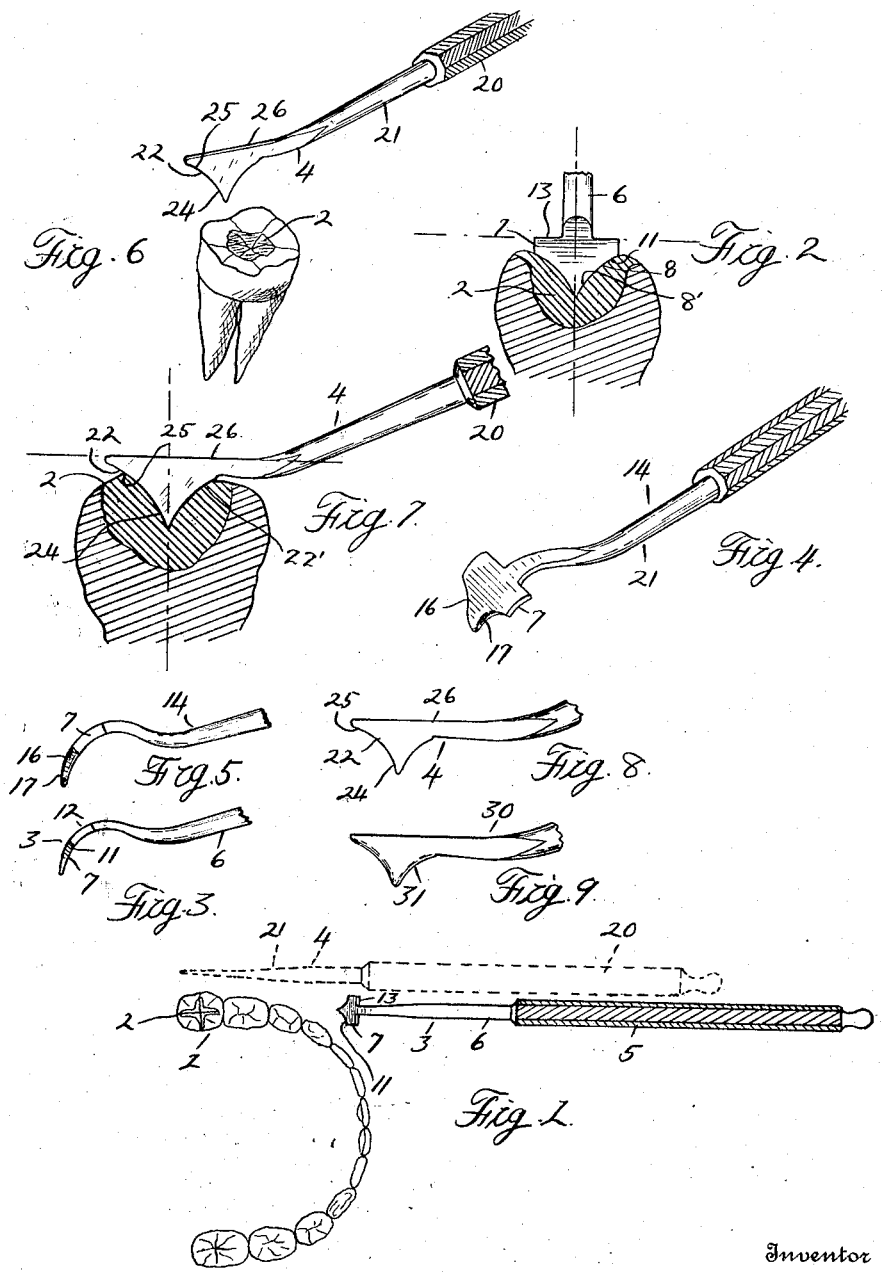
Inventor
Alexander S. Diack
By Whittemore, Hulbert, Whittemore & Belknap
Attorneys Patented June 17, 1924.

1,497,749

UNITED STATES PATENT OFFICE.

ALEXANDER S. DIACK, OF DETROIT, MICHIGAN.

DENTAL TOOL.

Application filed May 10, 1922. Serial No. 559,760.

*To all whom it may concern:*

Be it known that I, ALEXANDER S. DIACK, a citizen of the United States of America, residing at Detroit, in the county of Wayne and State of Michigan, have invented certain new and useful Improvements in Dental Tools, of which the following is a specification, reference being had therein to the accompanying drawings.

This invention relates to dental tools and refers particularly to instruments designed to reproduce, in the finishing of plastic restorations in teeth, the physical features so necessary to proper functioning, as they appeared in the original occluding surfaces.

Specifically, these instruments are designed to facilitate the finishing of amalgam restorations in teeth and enable the skilled operator to reproduce, as nearly perfect as may be, the original occlusal aspect of the tooth, thus insuring the parallelism of planes that nature intended for the efficient mastication of food.

One of the objects of the invention is the provision of an instrument having a bearing surface for engaging the remaining part of the original occluding surface whereby the instrument is guided in its movements.

Another object of the invention is the provision of means upon the instrument for indicating the angular relation of the work engaging portion of the instrument relative to the axis of the tooth.

With the above and other objects in view the invention consists in certain novel features of construction as will be more fully described and particularly pointed out in the appended claims.

In the accompanying drawings:

Fig. 1 is a plane view of the lower teeth showing in full lines a dental instrument for operating upon a carious tooth in one transverse direction and also showing in dotted lines a second dental instrument for operating upon the carious tooth in a transverse direction and relative to that taken by the first instrument;

Fig. 2 is a sectional elevation through a tooth with its amalgam restoration and showing one of the dental instruments applied thereto;

Fig. 3 is a side elevation of a portion of the dental tool illustrated in Fig. 2;

Fig. 4 is a perspective view of the dental tool conforming in shape to the tool in Fig. 2 but having a burnishing edge;

Fig. 5 is a side elevation of a portion of the tool illustrated in Fig. 4 and showing the burnishing edge;

Fig. 6 is a perspective view of a tooth having amalgam restoration and showing another dental instrument;

Fig. 7 is a sectional elevation through a tooth with its amalgam restoration and showing the instrument illustrated in Fig. 6 engaging the restoration;

Fig. 8 is a side elevation of a portion of the dental tool illustrated in Fig. 7;

Fig. 9 is a side elevation of a dental tool conforming in shape to the dental tool illustrated in Fig. 6 but having a burnishing edge.

Referring now to the drawings in which like characters of reference designate corresponding parts throughout the several views, the numeral 1 designates one of a series of teeth having an amalgam restoration of filling 2.

It is essential to finish amalgam restoration by the restitution of the depth, angle and direction of the sulci, grooves and pits; the inclinations and convexities of planes and facets as they appeared in the original tooth so that the cooperating upper and lower teeth will properly function in the mastication of food. The original occluding surfaces of the molar masticating teeth each having a longitudinal groove and a transverse groove and to reproduce these grooves in the filling, I have provided the instruments 3 and 4, in which the instrument 3 reproduces the longitudinal groove and the instrument 4 reproduces the transverse groove.

The instrument 3 comprises a handle 5 secured to a reduced rounded shank 6 which is formed integral with an enlarged head 7 having a reduced substantially V shaped portion 8 which is curved at its edges as shown at 8' to correspond as nearly as possible to the original aspect of the longitudinal groove in the tooth. The head also has the outwardly curved bearing edges 11 connecting into the inner ends of the working edges of the V-shaped portion and these bearing edges are adapted to engage the remaining part of the original tooth so that the working edges of the V-shaped portion will be guided during movement of the instrument over the tooth. The head is also curved longitudinally as shown at 12 and is provided with straight inner edges 13 upon opposite sides of the shank 6 whereby the skilled operator may be guided in keeping the instrument at right angles to the axis of the tooth.

In use, the V-shaped portion 8 of the head is placed at the rear edge of the tooth and is pulled over the filling toward the forward edge. The operator can accurately reproduce the physical features as they appeared in the original occluding surface by merely keeping the straight edges 13 of the head 7 in a horizontal position or in other words at right angles to the axis of the tooth. In some cases, the operator can also be guided in his work as a result of the bearing edges 11 engaging the original occluding surface of the tooth.

In order to remove all rough surfaces in the groove formed by the instrument 3 and to enable the skilled operator to reproduce, as nearly perfect as may be, the original occluding aspect of the tooth, an instrument 14 is employed. The instrument 14 conforms in shape to the instrument 3 but is provided with a V-shaped portion 16 having rounded or burnishing edges as shown at 17. The instrument 14 is used in the same manner as the instrument 3.

The instrument 4 for reproducing the transverse groove in the filling comprises a handle 20 secured to a reduced shank 21 which is formed integral with a substantially V-shaped head 22 which is curved at its edges as shown at 22' to correspond as nearly as possible to the original aspect of the transverse groove and to provide curved working edges 24 for engagement with the filling. The head 22 is also provided with the bearing edges 25 which connect into the inner ends of the working edges 24. In order that the skilled operator may be guided in keeping the instrument at right angles to the axis of the tooth the head 22 is provided with a flat upper surface as shown at 26.

In use, the instrument 4 is moved across the tooth and the flat upper surface 26 is kept in a horizontal position so that the working edges of the head will engage the filling and produce a transverse groove therein. An instrument 30 conforming in shape to the instrument 4 but having rounded or burnishing edges 31 is then employed to remove all rough surfaces and produce a finished groove which will correspond as nearly as may be to the original aspect of the transverse groove in the tooth.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. A dental instrument comprising a handle and a head carried by said handle having a portion provided with curved edges for reproducing in a plastic restoration in a carious tooth the physical features as they appeared in the original occluding surface of the tooth, said head also having a portion provided with curved bearing edges for engaging the remaining part of the original occluding surface of the tooth whereby the instrument may be guided in its movement.

2. A dental instrument of the class described comprising a handle and a head carried by said handle having oppositely inclined edge portions for engagement with the restoration and having a straight edge for indicating the angular relation of the head relative to the axis of the tooth.

3. A dental instrument of the class described comprising a handle and a head carried by said handle having a substantially V-shaped portion for engagement with the plastic restoration, said head also being provided with a straight edge portion disposed at right angles to a line bi-secting the angle of the V-shaped portion.

4. A dental instrument of the class described comprising a handle and a head carried by said handle having oppositely curved working edges for engagement with the plastic restoration and having curved bearing edges adapted to engage the remaining part of the original occluding surface of the tooth whereby the instrument may be guided in its movement.

5. A dental instrument of the class described comprising a handle, and a head carried by said handle having inwardly curved working edges for engagement with the plastic restoration and having curved bearing edges adapted to engage the remaining part of the original occluding surface of the tooth whereby the instrument may be guided in its movement, said curved bearing edges connecting into said inwardly curved working edges.

6. A dental instrument of the class described comprising a handle and a head carried by said handle having work engaging portions at the opposite edges thereof and provided with a straight edge indicating the angular relation of the work engaging portions relative to the axis of a tooth.

In testimony whereof I affix my signature.

ALEXANDER S. DIACK.